Dec. 20, 1938.  P. D. MERRILL ET AL  2,140,939
PIPE JOINT SEAL RING
Filed May 29, 1936  2 Sheets-Sheet 1
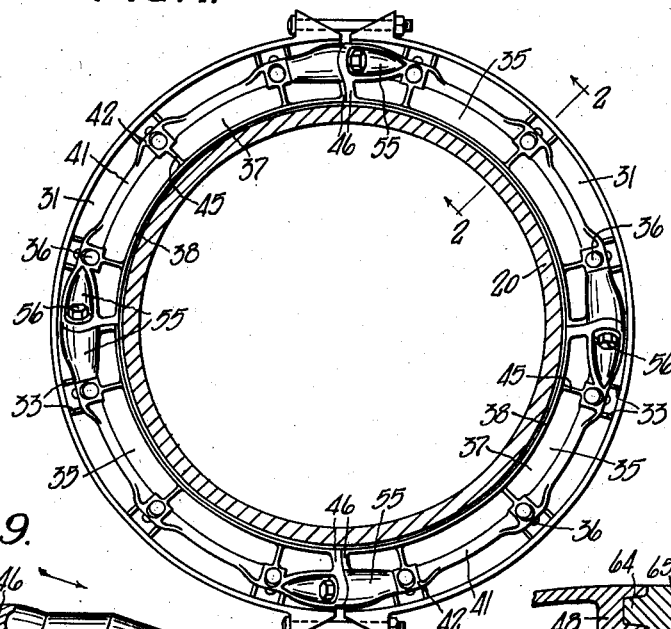
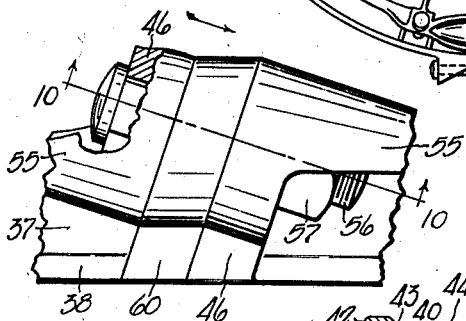
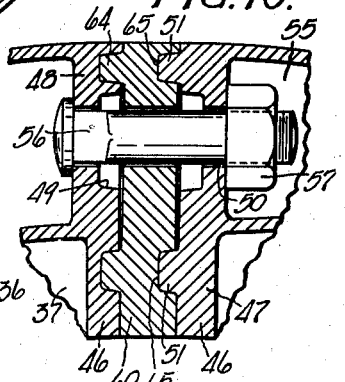
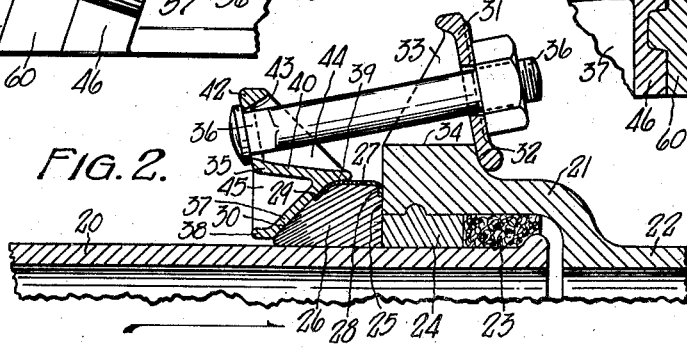
INVENTORS.
PATTERSON D MERRILL.
FREDERICK R. McMURRAY.
BY
Oltsch + Knoblock
ATTORNEYS.

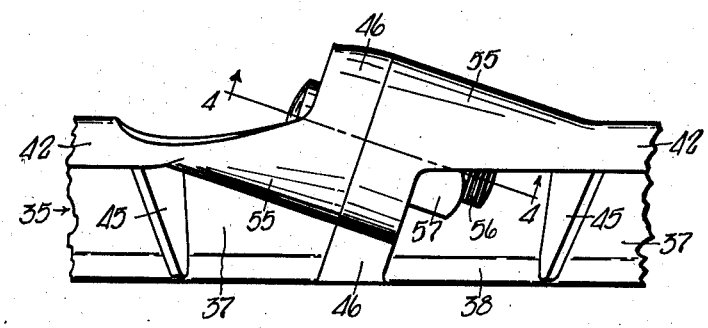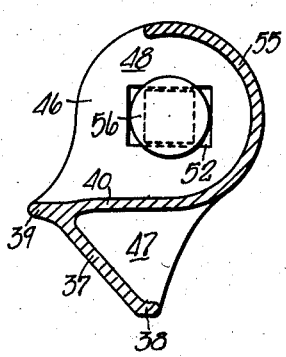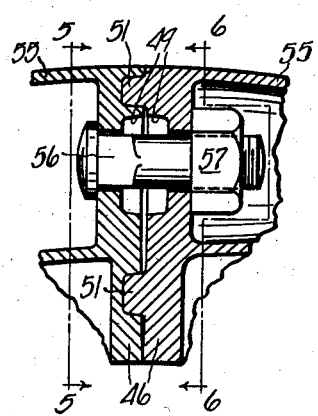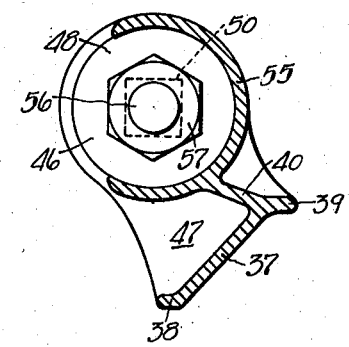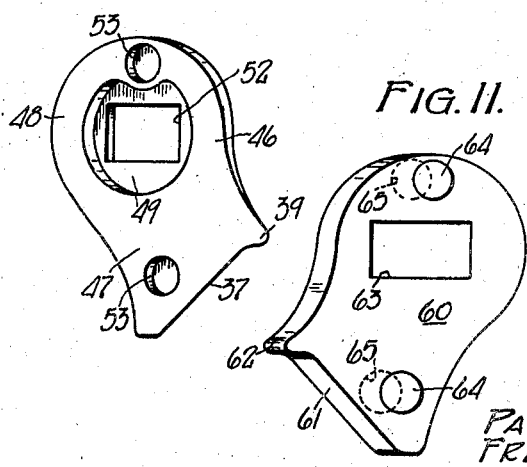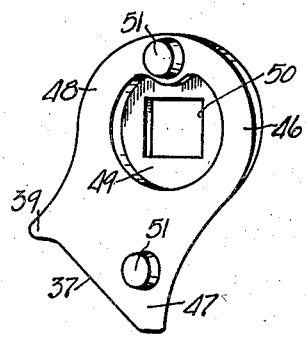

Patented Dec. 20, 1938

2,140,939

UNITED STATES PATENT OFFICE 2,140,939

PIPE JOINT SEAL RING

Patterson D. Merrill and Frederick R. McMurray, South Bend, Ind., assignors to M. B. Skinner Company, South Bend, Ind.

Application May 29, 1936, Serial No. 82,490

3 Claims. (Cl. 285—119)

This invention relates to pipe joint seals, such as means for sealing pipe joints of the "bell and spigot" type. More particularly the invention relates to the construction of the follower or gasket-compressing ring of such a device.

Heretofore, objection has been found to the follower rings of sealing devices of this character with respect to the means for securing together the parts of the rings. These objections were largely related to the distortion and disalignment to which the ring parts were subject, and to the spreading of the gasket-engaging portions thereof. This was caused in large measure by the spacing between the inner gasket-engaging portion of the ring and the portion upon which the securing means for the ring sections acted, and by the lack of means for effectively interlocking the ring parts in exact desired aligned or registering relation. These objections were especially noticeable in rings of large diameter which were required to be made in three or more sections.

It is therefore the primary object of this invention to provide a pipe joint seal with a ring formed of three or more sections assembled and positively locked in exact desired shape, form and relation.

A further object is to provide a device of this character wherein the means for securing together the parts of the ring are positioned in close proximity to the gasket-engaging face thereof to prevent spreading of the ring parts at their interconnection.

A further object is to provide a ring for a pipe joint seal which is made in three or more sections each provided at its ends with means for positively interlocking with the adjacent ring sections to insure registration of said section ends and resultant alignment of the ring sections.

A further object is to provide a sectional ring construction wherein the section-connecting means are conveniently located for assembly and manipulation.

A further object is to provide a sectional ring construction which may be enlarged without detracting from the characteristics of rigidity and desired form thereof.

A further object is to provide a sectional ring construction of this character with novel means for reinforcing the ends of the ring sections.

Other objects will be apparent from the description and the appended claims.

In the drawings:

Figure 1 is a face view of the pipe joint seal viewed in the direction of the arrow in Fig. 2, and applied to a pipe illustrated in section.

Figure 2 is a longitudinal sectional view of the pipe joint seal applied to a pipe joint and taken on line 2—2 of Fig. 1.

Figure 3 is a fragmentary side view of the interconnection between the sections of the follower ring.

Figure 4 is a fragmentary sectional view of the interconnection between follower ring sections taken on line 4—4 of Figure 3.

Figure 5 is a transverse sectional view of one end of a follower ring section taken on line 5—5 of Fig. 4 and perpendicularly to line 4—4 of Fig. 3.

Figure 6 is a transverse sectional view similar to Fig. 5, of the other end of a follower ring section, and taken on line 6—6 of Fig. 4.

Figure 7 is an end view of one end of a follower ring section.

Figure 8 is an end view of the other end of the follower ring section.

Figure 9 is a fragmentary side view of the interconnection between sections of the follower ring and illustrating the use of a member for enlarging the ring.

Figure 10 is a fragmentary sectional view taken on line 10—10 of Fig. 9.

Figure 11 is a face view of the ring enlarging member viewed in the direction of the arrow in Fig. 9.

Referring to the drawings, which illustrate the preferred embodiment of the invention, the numeral 20 designates the "spigot" end of a pipe which fits in the enlarged or "bell" end 21 of an adjacent pipe 22. In the annular space between the interfitting pipe ends is inserted a suitable packing 23 of hemp or oakum against which is poured hot lead to provide a seal 24. The lead 24 preferably terminates flush with the end face 25 of the "bell" 21 of pipe 22. An annular rubber gasket 26 of substantially triangular section encircles the pipe 20 with one face thereof in engagement with end face 25 of the bell of pipe 22 and the lead seal 24. A suitable thin metal annular strip 27 encircles the gasket 26 and is configured in cross section, as best illustrated in Fig. 2, to conform with the contour of the outer portion of the gasket, and includes a substantially perpendicular inwardly directed flange 28 at one side bearing against bell face 25 and an angular inwardly directed flange 29 at its other side bearing against the inclined face 30 of said gasket ring.

A sectional anchor ring 31 encircles the pipe 22 and bears against shoulder 32 in the bell portion thereof. Suitable fulcrum reinforcing flanges 33 projecting laterally from anchor ring 31 bear against the outer surface 34 of the bell portion of the pipe and serve to reinforce said ring. A follower ring 35 encircles pipe 20 to press gasket 26 against bell end face 25 and also radially inwardly to seal the pipe joint. Draw bolts 36 interconnect said anchor and follower rings to axially shift the latter into effective gasket-compressing relation.

This invention relates particularly to the construction of the follower ring 35, which is here illustrated as being made up of four arcuate sections. Each of these sections comprises a substantially conical inner gasket-engaging wall 37 terminating at its inner side in a rearwardly extending reinforcing flange 38. The outer side of wall 37 is provided with a substantially cylindrical reinforcing flange 39. Rearwardly from the outer side of wall 37 projects an integral substantially cylindrical wall 40, and an outwardly directed reinforcing flange projects angularly from the outer end of wall 40. At spaced points of each ring section the flange 41 is enlarged at 42, and provided with an aperture 43 for receiving the draw bolt 36, said enlargements 42 being reinforced by transverse flanges 44. A transverse flange 45 is also preferably provided between walls 37 and 40 in substantially radial alignment with aperture 43.

The ends of the ring sections are provided with walls 46 extending transversely thereof and angularly to the ring axis, as best illustrated in Fig. 3. The outer faces of these walls are each preferably slightly dished to provide for only marginal engagement thereof, as best illustrated in Fig. 4. The respective end walls are best illustrated in Figs. 7 and 8, and comprise an inner substantially V-shaped portion 47 and an outer enlarged substantially circular portion 48. In the outer faces of walls 46 are formed recesses 49 substantially concentric with circular portions 48 thereof. In one end wall of each ring section, substantially centrally of recessed portion 49 thereof, is formed an aperture 50 which is substantially square in shape, as illustrated in Figs. 6 and 8. This end wall is also provided with a pair of lugs 51 projecting from the outer face thereof, one thereof being positioned adjacent the apex of the inner portion 47 thereof, and the other being positioned in the outer portion 48 thereof intermediate recess 49 and outer edge thereof and preferably substantially opposite the first, so that aperture 50 is substantially aligned with said lugs. In the other end wall of each ring section at the recessed portion 49 thereof is formed a transversely elongated rectangular aperture 52, as illustrated in Figs. 5 and 7. In spaced relation to this aperture 52 and to recess 49 are formed recesses 53 in complementary relation to the positioning of, and adapted to receive with a comparatively close fit, the lugs 51 of the opposite wall of the adjacent ring section.

Integrally formed with the ring sections and walls 46 thereof at each end is a reinforcing flange structure 55 of arcuate cross section extending from the outer or marginal portion of circular portion 48 of each wall 46 in tapered shape to the adjacent flange enlargement 42 of said ring section. The flange structures 55 open at opposite sides of said ring section, as illustrated in Fig. 1, and the inner portion of each is preferably integrally formed with the wall 40 of said ring section.

In assembling the ring sections, the wall portions 46 of adjacent sections are disposed in registering relation, with the lugs 51 of one fitting in the recesses 53 of the other to insure said registration thereof. A suitable bolt 56 is passed through the apertures 50 and 52, and a nut 57 is threaded thereon to draw said ring sections into marginal face engagement. The bolt extends diagonally relative to the plane of the ring, and access thereto and to nut 57 is afforded by the shape of the opening afforded between the sides of curved reinforcing flange structures 55, as best illustrated in Figs. 5 and 6. This construction permits the bolt to be positioned closely adjacent the large diameter portion of gasket-engaging wall 37 of the ring, so that spreading of the inner portions of said walls of adjacent ring sections is avoided, and a continuous gasket-engaging wall is provided in the ring assembly. The use of the interfitting lugs and recesses 51, 53, together with the securing bolt, assures proper alignment of the ring sections at all times and positively prevents twisting or turning of one ring section relative to the others. The provision of the flange structure 55 at each end of the ring section serves to reinforce the same and to prevent distortion of the ring section per se upon application of gasket-compressing stress by the assembled ring; the elimination of which distortion further assures abutting engagement of the ends of the ring sections at the inner portion 47 thereof and consequent equal application of gasket-compressing stress by wall 37 throughout the entire circumference of the ring. The angular positioning of end walls 46 of the ring sections relative to the ring axis makes possible the adjacent positioning of bolts 56 to gasket-engaging wall 37 in readily accessible and manipulable relation to the assembly and without interference from the reinforcing flanges 55. It will also be observed from Figs. 5 and 6, that the construction permits the securing bolts to be positioned substantially in radial alignment with the gasket-engaging wall 37 to enhance the strength of the structure and apply the section-connecting stress of the bolts effectively to all cross sectional parts of the adjacent ring sections. Also of great importance is the positioning of the spaced lugs 51 and receiving recesses 53 therefor with relation to the securing bolt 56 which is between the former and substantially aligned therewith whereby said interfitting lugs and recesses cannot loosen unless the bolt is also loosened. The formation of the outer faces of the end walls 46 in slightly dished or concaved form assures marginal engagement of said faces and eliminates the possibility of rocking thereof with resultant disalignment of the connected ring sections.

Means for slightly enlarging the size of the ring assembly are illustrated in Figs. 9 to 11. For this purpose inserts 60 are adapted to be positioned between the adjacent end faces of the ring sections at two or more points. These inserts each comprise a plate of desired thickness having the same outline as the end walls 46 of the ring sections, with substantially parallel side faces which are relatively off-set as illustrated in Fig. 9 to accommodate positioning thereof diagonally of the ring axis and in registration with the complementary end faces of the adjacent ring sections while the body of the plate lies in and fills out the general shape of the ring assembly. The shape of each plate insert 60 provides an inclined face 61 adapted to complement the inner faces of the gasket-engaging walls 37 of the adjacent ring sections, and also provides an outwardly projecting shoulder or flange 62 complementing the flanges 39 of the adjacent ring sections. A transversely elongated aperture 63 is formed in the plate to register with the apertures 50 and 52 of the end walls 46 of the ring sections. From one face of the insert 60 project lugs 64 complementary to and adapted to fit into the recesses 53 of the abutting ring section. In the other face of the insert 60 are formed recesses 65 complementary to and adapted to receive the lugs 51 of the abutting ring section. These lugs and recesses 64, 65 are laterally offset as illustrated in Fig. 11, as is necessary in view of the diagonal relation of the insert to the ring axis. The elongated plate aperture 63 accommodates passage of bolt 56 therethrough, and the provision of one wall 46 with elongated aperture 52 accommodates the off-center position of bolt 56 relative to said wall and occasioned by the use of insert 60. It will be noted that the provision of lugs 64 and recesses 65, and the interfitting thereof with the lugs 51 and recesses 53 of the adjacent ring sections, provides the enlarged ring assembly with the same superior features above mentioned, including a continuous gasket-engaging face and rigid interconnection of ring sections.

We claim:

1. In a pipe joint seal, a pipe-encircling ring formed from a plurality of arcuate sections and having a gasket-engaging face, end walls formed integrally with said sections and extending diagonally relative to the ring axis and including an apertured portion projecting radially outwardly from said gasket-engaging face, a securing member extending through said wall apertures in diagonal relation to the plane of the ring and to the ring axis for drawing said sections together endwise, and a circumferentially extending reinforcing flange projecting outwardly of each ring section at each end thereof each flange merging with a portion of the margin of the projecting portion of the adjacent end wall.

2. In a pipe joint seal, a pipe-encircling ring formed from a plurality of arcuate sections and having a gasket-engaging face, end walls formed integrally with said sections and extending diagonally relative to the ring axis and including an apertured portion projecting radially outwardly from said gasket-engaging face, a securing member extending through said wall apertures in diagonal relation to the plane of the ring and to the ring axis for drawing said sections together endwise, and an integral flange at each end of each ring section extending circumferentially thereof and merging with portions of the margins of the projecting portions of said end walls, said flanges being tapered and of arcuate cross section.

3. In a pipe joint seal, the combination with a pipe-encircling ring subjected to transverse disaligning stress formed of a plurality of arcuate sections, a wall at each end of each section extending diagonally to the ring axis, means on each wall for effecting registration of complementary walls of adjacent sections, of a plate inserted between adjacent end walls, means on opposite sides of said plate and cooperating with said registering means to effect registration of said plate with said end walls, said last named means being relatively offset, and means for securing said plate between said walls and for locking said registering means in operative relation.

PATTERSON D. MERRILL.
FREDERICK R. McMURRAY.